US012636686B2

(12) United States Patent
Kang

(10) Patent No.: US 12,636,686 B2
(45) Date of Patent: May 26, 2026

(54) AIR HOOD DEVICE

(71) Applicant: ALLS-WELL CO., LTD., Incheon (KR)

(72) Inventor: Youn Soo Kang, Incheon (KR)

(73) Assignee: ALLS-WELL CO., LTD., Incheon (KR)

( * ) Notice: Subject to any disclaimer, the term of this patent is extended or adjusted under 35 U.S.C. 154(b) by 125 days.

(21) Appl. No.: 18/912,617

(22) Filed: Oct. 11, 2024

(65) Prior Publication Data

US 2025/0121417 A1 Apr. 17, 2025

(30) Foreign Application Priority Data

Oct. 13, 2023 (KR) ........................ 10-2023-0136994

(51) Int. Cl.
*B08B 15/02* (2006.01)

(52) U.S. Cl.
CPC .................................... *B08B 15/02* (2013.01)

(58) Field of Classification Search
CPC ......... B08B 15/02; B08B 15/023; B01L 1/00; F24C 15/20; F24C 15/2007; F24C 15/2028; B23K 26/127-128; B65G 53/58; B65G 53/521
USPC ......... 454/56-62, 193; 55/385.2; 219/121.86
See application file for complete search history.

(56) References Cited

U.S. PATENT DOCUMENTS

| | | | | | |
|---|---|---|---|---|---|
| 259,457 | A * | 6/1882 | Armington | F16L 5/00 | 193/17 |
| 404,780 | A * | 6/1889 | Dowd | F16L 43/001 | 285/280 |
| 846,973 | A * | 3/1907 | Allington | B65G 53/521 | 406/117 |
| 955,952 | A * | 4/1910 | East | B65G 53/52 | 239/587.5 |
| 2,693,395 | A * | 11/1954 | Berg | B01J 8/0025 | 422/219 |
| 2,943,994 | A * | 7/1960 | McCain, Jr. | C10G 9/30 | 208/100 |

(Continued)

FOREIGN PATENT DOCUMENTS

| | | | | |
|---|---|---|---|---|
| CN | 115571639 A * | 1/2023 | B65G 53/34 |
| JP | 5767974 B2 | 8/2015 | |

(Continued)

OTHER PUBLICATIONS

Korean Office Action for related KR Application No. 10-2023-0136994 mailed Dec. 20, 2023 from Korean Intellectual Property Office.

*Primary Examiner* — Joseph A Dillon, Jr.

(74) *Attorney, Agent, or Firm* — Paratus Law Group, PLLC

(57) ABSTRACT

An air hood device includes: first to N-th (where N is a natural number greater than or equal to 2) air intake cells; and an air exhaust pipe connecting first to N-th air outlets in a one-to-one correspondence with first to N-th air intake cells 110 in a row. The first to N-th air intake cells are formed to have air exhaust areas of varying sizes, either all or partially. Air intake areas of the first to N-th air outlets are arranged on a same plane. The air exhaust areas of the first to N-th air intake cells are connected to the air intake areas of the first to N-th air outlets on a same horizontal plane.

8 Claims, 5 Drawing Sheets

(56) References Cited

U.S. PATENT DOCUMENTS

| | | | | | |
|---|---|---|---|---|---|
| 2,978,279 | A * | 4/1961 | Bergstrom | B01J 8/0025 | 406/174 |
| 3,591,238 | A * | 7/1971 | Titus | B65G 53/30 | 406/197 |
| 3,752,056 | A * | 8/1973 | Chamberlin | B08B 15/023 | 454/59 |
| 4,019,783 | A * | 4/1977 | Kayser | C10J 3/30 | 406/197 |
| 4,023,473 | A * | 5/1977 | Russell | B08B 15/023 | 49/404 |
| 4,260,298 | A * | 4/1981 | Zenz | B01J 3/02 | 406/146 |
| 4,491,442 | A * | 1/1985 | Stelter | B65G 53/58 | 406/195 |
| 4,529,337 | A * | 7/1985 | Hilgraf | A23C 9/16 | 239/650 |
| 4,531,862 | A * | 7/1985 | Kern | B65G 53/528 | 239/455 |
| 4,995,765 | A * | 2/1991 | Tokuhiro | B65F 5/005 | 406/84 |
| 5,205,677 | A * | 4/1993 | McKenna | A01D 46/20 | 414/508 |
| 5,220,940 | A * | 6/1993 | Palmer | G05D 16/024 | 137/500 |
| 5,251,608 | A * | 10/1993 | Cote | F24C 15/2028 | 454/56 |
| 5,500,508 | A * | 3/1996 | Gerl | F24C 15/2007 | 126/285 B |
| 5,568,947 | A * | 10/1996 | Paquette | F16L 5/00 | 52/220.8 |
| 5,855,509 | A * | 1/1999 | White | B05B 16/60 | 454/52 |
| 6,290,266 | B1 * | 9/2001 | Kawano | F16L 43/001 | 285/125.1 |
| 6,461,233 | B1 * | 10/2002 | Gilkison | B08B 15/023 | 454/56 |
| 8,251,406 | B2 * | 8/2012 | Kawano | F15D 1/04 | 285/179 |
| 11,504,772 | B2 * | 11/2022 | Mehl | B29C 64/153 | |
| 11,927,351 | B2 * | 3/2024 | Singh | F24F 1/58 | |
| 2025/0123020 | A1 * | 4/2025 | Kang | F24F 13/02 | |

FOREIGN PATENT DOCUMENTS

| | | |
|---|---|---|
| KR | 10-2518027 B1 | 4/2023 |
| KR | 10-2524785 B1 | 4/2023 |

* cited by examiner (a)

(b)

AIR HOOD DEVICE

CROSS-REFERENCE TO PRIOR APPLICATION

This application claims priority to Korean Patent Application No. 10-2023-0136994 (filed on Oct. 13, 2023), which is all hereby incorporated by reference in their entirety.

BACKGROUND

The present disclosure relates to an air hood device, and more specifically, to an air hood device having hoods implemented in the form of a plurality of cells to achieve hood performance for the individual cells.

A hood refers to the entrance of a local exhaust system designed to capture contaminated air within a scattering range from a source, preventing the dispersion of hazardous substances generated in a work environment from scattering to the surroundings. The shape and size of the hood may vary depending on the type of work, the nature and generation of hazardous substances, and the size of the workspace.

A hood is installed to draw air at a certain speed or higher to a specific point. That is, if a hood opening is positioned at a certain distance from a source, the airflow decreases as a distance from the hood opening increases, and there is almost no airflow at a distance equal to the diameter of the opening.

To improve hood performance, a depth of the hood relative to a diameter of the duct must be sufficient. For example, the depth D of the hood relative to the diameter d of the duct must be determined, such as $D \geq 3d$, for proper performance. However, due to environmental constraints at the hood installation site, it may not always be possible to install a hood with sufficient depth. In such cases, reducing the hood depth may lead to a decrease in capture efficiency.

Therefore, it is necessary to change the shape or design of the hood to maintain capture efficiency even when the hood depth is reduced.

RELATED ART

Korean Patent No. 10-2518027 (Mar. 31, 2023)

SUMMARY

The present disclosure provides an air hood device having hoods implemented in the form of a plurality of cells to achieve hood performance for individual cells.

The present disclosure also provides an air hood device capable of being implemented in a segmented fashion by connecting a tapered duct to the hood cells to improve hood performance, thereby ensuring that each hood is sufficient depth relative to its overall size.

The present disclosure also provides an air hood device capable of evenly drawing in air from widespread and simultaneously occurring sources of air pollution.

In one aspect, an air hood device includes: first to N-th (where N is a natural number greater than or equal to 2) air intake cells; and an air exhaust pipe connecting first to N-th air outlets in a one-to-one correspondence with first to N-th air intake cells 110 in a row. The first to N-th air intake cells are formed to have air exhaust areas of varying sizes, either all or partially. Air intake areas of the first to N-th air outlets are arranged on a same plane. The air exhaust areas of the first to N-th air intake cells are connected to the air intake areas of the first to N-th air outlets on a same horizontal plane.

The first to N-th air intake cells may be arranged toward a dust source and simultaneously perform air intake.

When dust generated from the dust source is drawn in through the first to N-th air intake cells, the air exhaust pipe may move the drawn dust in a direction toward one of the first to N-th air outlets and exhaust the dust to an outside.

The air exhaust pipe may be formed as a duct with a same height and a varying width for M-th to N-th air outlets (where M is a natural number greater than or equal to 1 and less than or equal to N).

The air exhaust pipe may form an exhaust flow by adjusting a width and increasing a volume in a direction from the first air outlet 131 to the N-th air outlet.

The air exhaust pipe may form the exhaust flow by adjusting a width at a corresponding connection point and gradually increasing a volume in a stepwise manner in a direction from the first air outlet to the N-th air outlet.

The air hood device may have the first to N-th air intake cells and the first to N-th air outlets arranged side by side to form a matrix structure.

Each of the first to N-th air intake cells may have a hollow shape with both ends open, with one end connected to the air exhaust pipe, and the other end covering at least a portion of a dust generation range of a dust source.

The disclosed technology may have the following effects: However, it should not be construed that the scope of the disclosed technology is limited thereby, as it does not mean that a specific embodiment must include all or only the following effects.

An air hood device according to an embodiment of the present disclosure may have hoods implemented in the form of a plurality of cells to achieve hood performance for individual cells.

The air hood device according to an embodiment of the present disclosure can be implemented in a segmented fashion by connecting a tapered duct to the hood cells to improve hood performance, thereby ensuring that each hood is sufficient depth relative to its overall size.

The air hood device according to an embodiment of the present disclosure may evenly draw in air from widespread and simultaneously occurring sources of air pollution.

The present invention, therefore, segments the hood into multiple hood cells, enabling the combination of the segmented hoods to form a larger surface area, which ensures a uniform hood suction effect even in narrow spaces where it is difficult to secure fluid flow.

DETAILED DESCRIPTION

Figure 1:
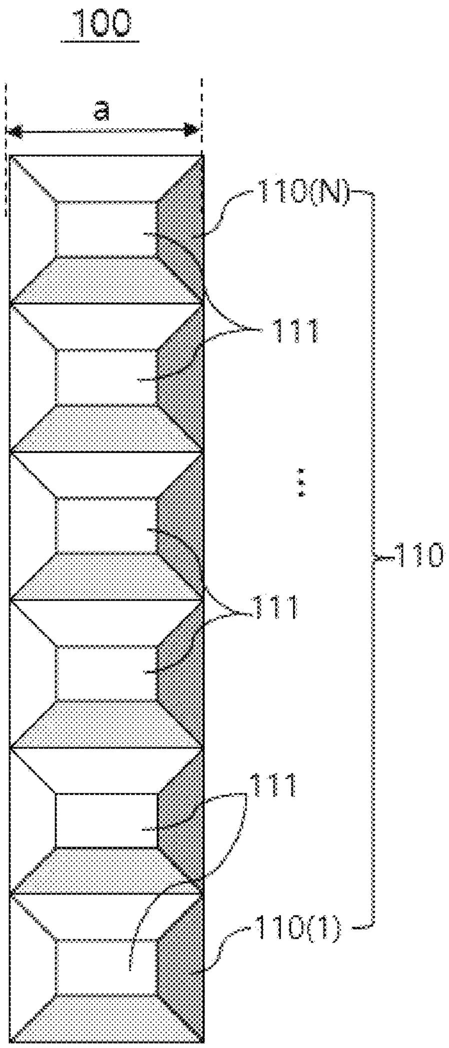
FIG. 1 is a drawing illustrating an air hood device according to an embodiment of the present disclosure.

A description of the present disclosure is merely an embodiment for a structural or functional description and the scope of the present disclosure should not be construed as being limited by an embodiment described in a text. That is, since the embodiment can be variously changed and have various forms, the scope of the present disclosure should be understood to include equivalents capable of realizing the technical spirit. Further, it should be understood that since a specific embodiment should include all objects or effects or include only the effect, the scope of the present disclosure is limited by the object or effect.

Meanwhile, meanings of terms described in the present application should be understood as follows.

The terms "first," "second," and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompasses a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

If it is not contrarily defined, all terms used herein have the same meanings as those generally understood by those skilled in the art. Terms which are defined in a generally used dictionary should be interpreted to have the same meanings as the meanings in the context of the related art, and are not interpreted as ideal meanings or excessively formal meanings unless clearly defined in the present application.

Figure 2:
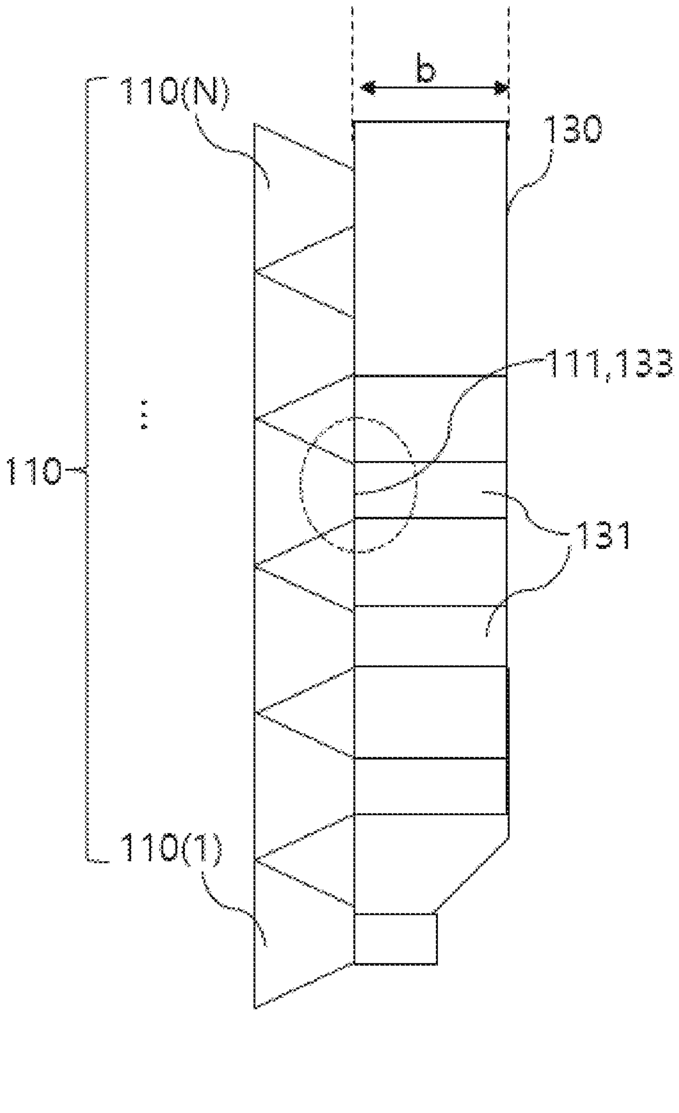
FIG. 2 is a drawing explaining the air hood device of FIG. 1.
Figure 3:
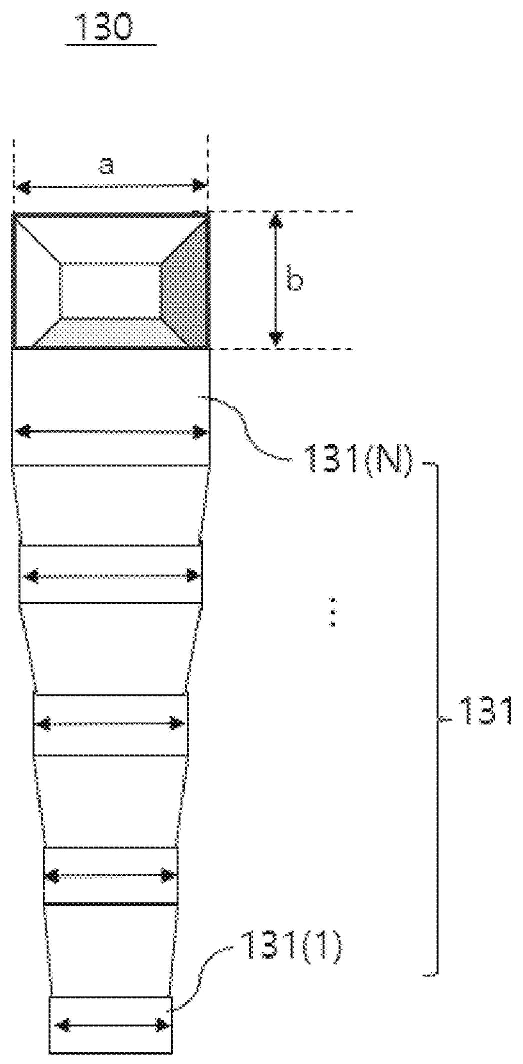
FIG. 3 is a drawing for explaining an air exhaust pipe of FIG. 2.

FIG. 1 is a drawing illustrating an air hood device according to an embodiment of the present disclosure, FIG. 2 is a drawing illustrating the air hood device of FIG. 1, and FIG. 3 is a drawing illustrating an air exhaust pipe of FIG. 2.

Referring to FIGS. 1 to 3, an air hood device 100 may include first to N-th (where N is a natural number equal to or greater than 2) air intake cells 110 and an air exhaust pipe 130.

Each of the first to N-th air intake cells 110 may have a hollow shape with both ends open, with one end connected to the air exhaust pipe 130 and the other end covering at least a portion of a dust generation range of a dust source, so that air can be drawn from a first region into a second region. Here, the first region may correspond to an area adjacent to the dust source, and the second region may correspond to an internal area of the air hood device 100. Each of the first to N-th air intake cells 110 may act as an independent small hood. In other words, the air hood device 100 may be configured with hoods implemented as cells and form a module by grouping multiple hood cells to secure a space according to a situation. In one embodiment, the first to N-th air intake cells 110 may be arranged in series, but are not necessarily limited to this configuration, and the first to N-th air intake cells 110 may also be formed in various shapes, such as a matrix where multiple cells are arranged side by side. Here, the first air intake cell 110(1) may be positioned relatively downstream in an airflow direction, while the N-th air intake cell 110(N) may be positioned upstream.

The first to N-th air intake cells 110 may be formed to have air exhaust areas 111 of varying sizes, either all or partially. For example, the first air intake cell 110(1) may have an air exhaust area 111 of 150 mm×200 mm, while the N-th air intake cell 110(N) may have an air exhaust area 111 of 140 mm×200 mm. The air intake cells 110 placed in between may have air exhaust areas 111 of sizes 160 mm×200 mm and 186 mm×200 mm. That is, the air hood device 100 may be designed with an optimal hood shape by varying the size of the air exhaust areas 111 of the first and N-th air intake cells 110 considering the type and characteristics of the pollutant source.

Each of the first to N-th air intake cells 110 may have a hollow polyhedral shape, with a cross-sectional area gradually decreasing toward the air exhaust area 111. For example, each of the first to N-th air intake cells 110 may have a hollow hexahedral shape with a trapezoidal cross-section as shown in FIG. 2. At this point, each of the first to N-th air intake cells 110 has one end defining an air exhaust area 111 and the other end opposite thereto open. In one embodiment, the first to N-th air intake cells 110 may be arranged toward a dust source and may simultaneously perform air intake. The first to N-th air intake cells 110 may discharge the drawn air through the air exhaust area 111 into the air exhaust pipe 130.

The air exhaust pipe 130 may connect the first to N-th air outlets 131 in a one-to-one correspondence with the first to N-th air intake cells 110 in a row. The air intake areas 133 of the first to N-th air outlets 131 may be positioned on a same plane. Here, the air exhaust areas 111 of the first to N-th air intake cells 110 may be connected to the air intake areas 133 of the first to N-th air outlets 131 on a same horizontal plane. That is, the air exhaust areas 111 of the first to N-th air intake cells 110 may be arranged in a straight line with the air intake areas 133 of the first to N-th air outlets 131, and may be formed with a same height to facilitate a smooth flow of air. The first to N-th air outlets 131 may be formed to have air intake areas 133 of varying sizes, either all or partially, to match the connected air exhaust areas 111.

In one embodiment, when dust generated from the dust source is drawn in through the first to N-th air intake cells 110, the air exhaust pipe 130 may move the drawn dust toward one of the first to N-th air outlets 131 and exhaust the dust to the outside. Here, as shown in FIG. 3, the air exhaust pipe 130 may be formed as a duct with a same height and varying width for the M-th to N-th air outlets 131. Here, M is a natural number equal to or greater than 1 and less than or equal to N.

In one embodiment, the air exhaust pipe 130 may form an exhaust flow by adjusting a width and increasing a volume in a direction from the first air outlet 131(1) to the N-th air outlet 131(N). That is, the air exhaust pipe 130 may be formed to be tapered from the N-th air outlet 131(N) toward the first air outlet 131(1). For example, if an airflow direction moves toward an upper side (the N-th air outlet) from a lower side (the first air outlet), the cross-sectional area decreases toward the lower side, so that air flows evenly not only in the upper side but also in the lower side along the airflow direction. In another embodiment, the air exhaust pipe 130 may form an exhaust flow by adjusting a width at a corresponding connection point and gradually increasing a volume in a stepwise manner in a direction from the first air outlet 131(1) to the N-th air outlet 131(N). Here, the duct shape of the air exhaust pipe 130 may take various forms, such as a diamond shape and an inverted trapezoid.

Figure 4:
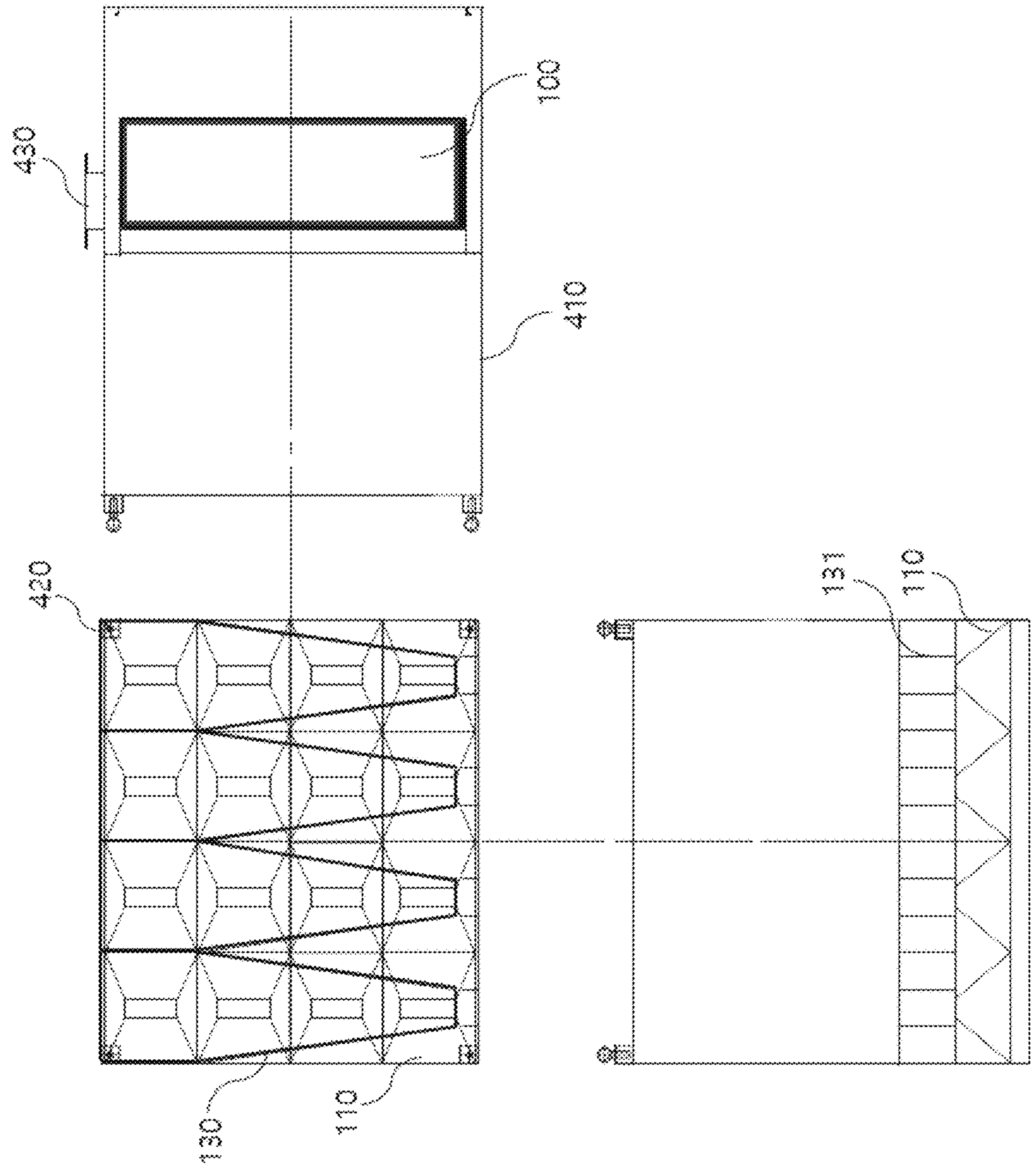
FIG. 4 is a drawing for explaining a matrix suction hood structure of an air hood device according to the present disclosure.

FIG. 4 is a drawing for explaining a matrix suction hood structure of an air hood device according to the present disclosure.

Referring to FIG. 4, an air hood device 100 may be assembled in an assembly form within a hood box 410. Here, the hood box 410 may be formed of stainless steel (such as STS 304, 316) with good corrosion resistance. The corners of the hood box 410 may be provided with connection brackets 420, so that the hood box 410 is fixed to an installation site, such as a ceiling.

The air hood device 100 may have first to N-th air intake cells 110 and first to N-th air outlets 131 arranged side by side to form a matrix structure. Here, the air hood device 100 is formed in a 4×4 matrix structure, but it is not limited thereto, and the number of air intake cells 110 and air outlets 131 corresponding thereto may be adjusted to form various sizes of matrix structures. The air hood device 100 is implemented in the form of a matrix suction hood and thus able to cover a wide range of dust sources, thereby improving hood performance. The air exhaust pipe 130 may be tapered toward one of the first to N-th air outlets 131 so as to form an exhaust airflow.

When dust generated from the dust source is drawn through the first to N-th air intake cells 110, the air exhaust pipe 130 may move the drawn dust toward one of the first to N-th air outlets 131 and exhaust the dust to the outside. At this point, the dust that moves along with the air is discharged through an opening hole of a duct connection flange 430.

Figure 5:
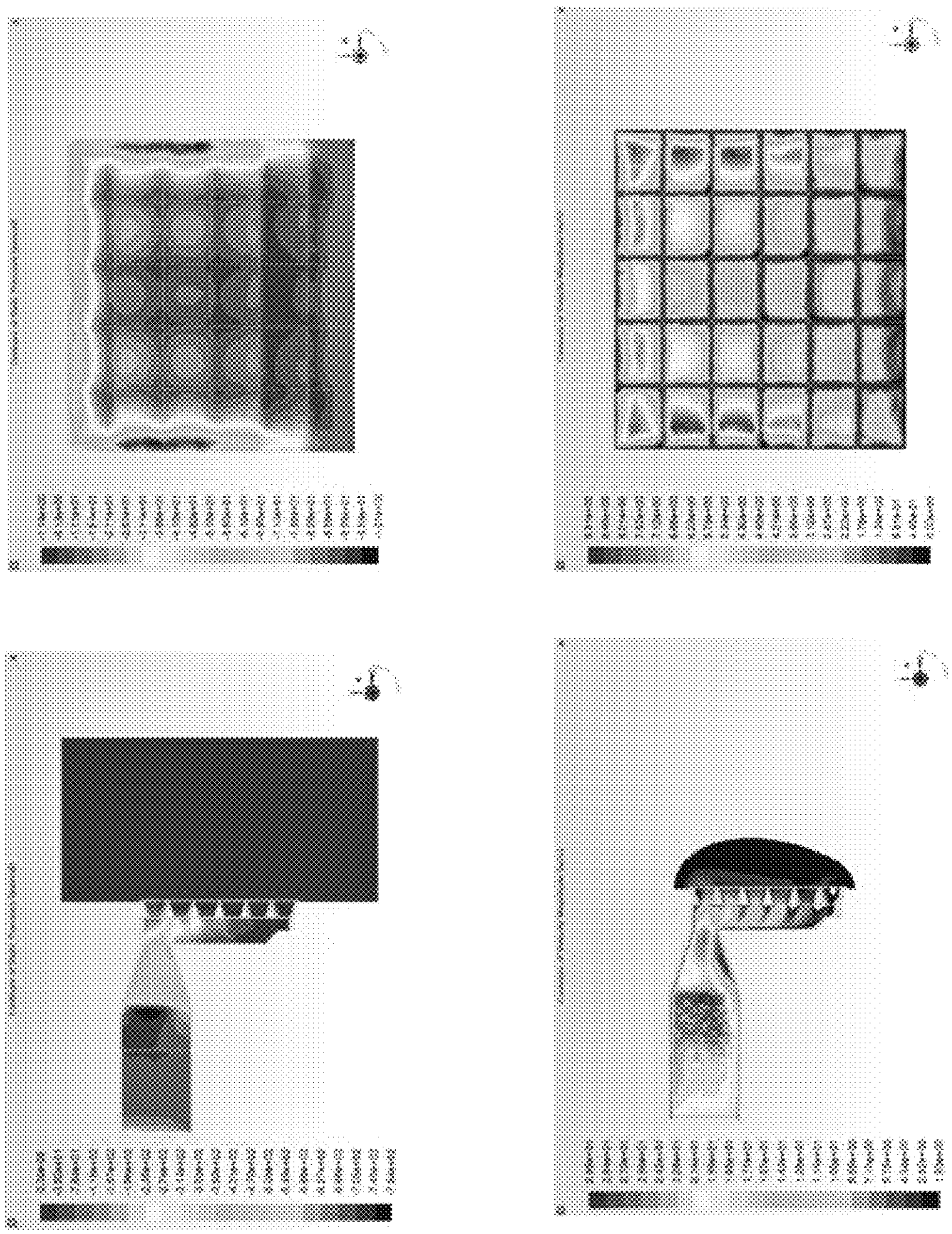
FIG. 5 is a drawing showing the flow of air by an air hood device according to the present disclosure.

FIG. 5 shows the airflow by the air hood device according to the present disclosure, where (a) shows the pressure and (b) shows the velocity.

Referring to (a) and (b) of FIG. 5, an air hood device 100 may be installed at every location where hazardous substances are generated to control the sources of dust and the like. For example, the air hood device 100 may be installed at cooktops, ovens, dishwashers, etc., to exhaust substances that are harmful to the human body, such as dust, fumes, mist, vapor, or gases.

When the air hood device 100 forms a matrix by arranging first to N-th air intake cells 110 and air outlets 131 side by side, it may be seen that air is drawn in and discharged simultaneously from the dust source. Looking at (a) of FIG. 5, it can be seen that the air hood device 100 according to the present disclosure transmits pressure of a same magnitude throughout the fluid. Here, the pressure is thermodynamic pressure, which is the pressure detected at the location of a fluid particle. Referring to (b) of FIG. 5, it can be seen that the air hood device 100 effectively controls an air volume according to the simultaneous air intake of each air intake cell. That is, even with a low flow rate, pollutants may be effectively captured.

An air hood device according to an embodiment has a structure with a plurality of air intake cells, enabling simultaneous air intake through the cells, thereby improving the hood's capture efficiency. In addition, it is possible to form an exhaust airflow by connecting air outlets in a one-to-one correspondence with the air intake cells in a row, and by increasing the volume of the air outlet pipe from an outlet located on a downstream side to an outlet located on an upstream side relative to an air flow direction. Therefore, even if a sufficient hood depth is not secured, the performance of the hood may be improved, and the air hood device may be installed without spatial constraints.

Although the present disclosure has been described above with reference to preferred embodiments thereof, it will be understood by those skilled in the art that various modifications and changes may be made to the present disclosure without departing from the spirit and scope of the present disclosure as set forth in the claims below.

[Detailed Description of Main Elements]

| | |
|---|---|
| 100: air hood device | |
| 110(110(1), . . . , | 110(N)): first to N-th air intake cells |
| 111: air exhaust area | |
| 130: air exhaust pipe | |
| 131 (131 (1), . . . , | 131 (N)): first to N-th air outlets |
| 133: air intake area | |
| 410: hood box | 420: connection bracket |
| 430: duct connection flange | |

What is claimed is:

1. An air hood device comprising:

first to N-th (where N is a natural number greater than or equal to 2) air intake cells; and an air exhaust pipe connecting first to N-th air outlets in a one-to-one correspondence with first to N-th air intake cells in a row, wherein the first to N-th air intake cells are formed to have air exhaust areas of varying sizes, either all or partially, wherein air intake areas of the first to N-th air outlets are arranged on a same plane, and wherein the air exhaust areas of the first to N-th air intake cells are connected to the air intake areas of the first to N-th air outlets on a same horizontal plane.

2. The air hood device of claim 1, wherein the first to N-th air intake cells are arranged toward a dust source and simultaneously perform air intake.

3. The air hood device of claim 1, wherein, when dust generated from a dust source is drawn in through the first to N-th air intake cells, the air exhaust pipe moves the drawn dust in a direction toward one of the first to N-th air outlets and exhaust the dust to an outside.

4. The air hood device of claim 1, wherein the air exhaust pipe is formed as a duct with a same height and a varying width for M-th to N-th air outlets (where M is a natural number greater than or equal to 1 and less than or equal to N).

5. The air hood device of claim 1, wherein the air exhaust pipe forms an exhaust flow by adjusting a width and increasing a volume in a direction from the first air outlet 131 to the N-th air outlet.

6. The air hood device of claim 1, wherein the air exhaust pipe forms an exhaust flow by adjusting a width at a corresponding connection point and gradually increasing a volume in a stepwise manner in a direction from the first air outlet to the N-th air outlet.

7. The air hood device of claim 1, wherein the air hood device has the first to N-th air intake cells and the first to N-th air outlets arranged side by side to form a matrix structure.

8. The air hood device of claim 1, wherein each of the first to N-th air intake cells has a hollow shape and two ends with both ends open, with one end connected to the air exhaust pipe, and the other end covering at least a portion of a dust generation range of a dust source.

* * * * *